UNITED STATES PATENT OFFICE 1,931,396

PROCESS OF VULCANIZING RUBBER

Robert L. Sibley, Nitro, W. Va., assignor to The Rubber Service Laboratories Company, Akron, Ohio, a corporation of Ohio No Drawing. Application September 25, 1931, Serial No. 565,193. Renewed January 6, 1933

32 Claims. (Cl. 18—53)

The present invention relates to the vulcanization of rubber by a new and improved process wherein a new type of rubber vulcanization accelerator is employed. The manufacture and means of employing the preferred new class of rubber vulcanization accelerators are fully set forth hereinafter and will be readily understood from the following description and examples of a preferred mode of carrying out the invention.

The preferred new class of accelerators comprise a reaction product of an organic base and a mercaptoarylthiazole, further reacted with an organic acid halide. The preferred class of compounds have been incorporated alone in a rubber mix as a rubber vulcanization accelerator, but have been employed preferably in conjunction with a basic organic nitrogen-containing accelerating compound, for example, diphenylguanidine, as a component of a mixed accelerator.

The following is one example of a preferred method of manufacturing one of the new class of accelerating compounds, comprising a phthalyl chloride derivative of the reaction product of mercaptobenzothiazole and hexa-methylene-tetramine: Substantially one molecular proportion (140 parts by weight) of hexa-methylene-tetramine and substantially one and one-half molecular proportions (249 parts by weight) of mercaptobenzothiazole were placed in a suitable vessel and the temperature gradually raised to approximately 135° C., while agitating the mixture. The product thus formed was further reacted with a comparatively small excess over one-half a molecular proportion (125 parts by weight) of phthalyl chloride by maintaining the mixture of the reactants at a temperature of approximately 70 to 90° C. for a suitable period necessary to complete the reaction, preferably for approximately one hour, while agitating the mixture. The final product formed, when cool, was a brittle yellow resin, melting at substantially 68–76° C.

A portion of the material prepared as described above was incorporated in the usual manner in a so-called pure gum rubber stock comprising

|  | Parts |
|---|---|
| Pale crepe rubber | 100 |
| Zinc oxide | 5 |
| Sulfur | 3 |
| Stearic acid | 1 |
| The reaction product of substantially one-half a molecular proportion of phthalyl chloride and substantially one molecular proportion of the mercaptobenzothiazole derivative of hexa-methylene-tetramine | 1 |

The rubber stock thus compounded was then cured in the usual manner by heating in a press for different periods of time at the temperature given by 30 pounds of steam pressure per square inch. The vulcanized rubber product on testing was found to possess the following tensile and modulus characteristics:

Table I

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 234 | 655 | 2655 | 4200 | 800 |
| 45 | 30 | 299 | 790 | 3180 | 4750 | 780 |
| 60 | 30 | 316 | 918 | 3435 | 4960 | 760 |

The above data show that the product described above possesses desirable accelerating characteristics when employed in the vulcanization process in the manner described.

The product described above has also been employed in a rubber stock in conjunction with diphenylguanidine, and the mixed accelerator thus formed was found to possess increased accelerating properties when employed in the vulcanization process.

Another example of the preferred class of compounds was prepared in a manner analogous to that described above, except that a comparatively small excess over one molecular proportion (250 parts by weight) of phthalyl chloride was employed in this case, the proportions of the other reactants being substantially the same as in the previous example. The product formed was a hard, yellow resin, melting at substantially 70–75° C.

A portion of this accelerator was compounded in the usual manner in a rubber stock comprising

|  | Parts |
|---|---|
| Pale crepe rubber | 100 |
| Zinc oxide | 5 |
| Sulfur | 3 |
| The reaction product of substantially one molecular proportion of phthalyl chloride and substantially one molecular proportion of the mercaptobenzothiazole derivative of hexa-methylene-tetramine | 1 |

The stock thus formed was cured in the usual manner and the product after curing was tested to determine its modulus and tensile properties. The results follow:

Table II

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 45 | 20 | 91 | 145 | 385 | 1163 | 920 |
| 60 | 20 | 109 | 223 | 716 | 1695 | 860 |
| 90 | 20 | 150 | 323 | 1065 | 2410 | 850 |

These figures show that the accelerator above described also shows desirable properties when employed in a rubber mix.

The reaction product of substantially one molecular proportion of phthalyl chloride and substantially one molecular proportion of the mercaptobenzothiazole derivative of hexa-methylene-tetramine was also employed in conjunction with a basic organic nitrogen-containing accelerator, for example, diphenylguanidine. Thus, a rubber stock was compounded comprising

|   | Parts |
|---|---|
| Pale crepe rubber | 100 |
| Zinc oxide | 5 |
| Sulfur | 3 |
| Diphenylguanidine | 0.6 |
| The reaction product of substantially one molecular proportion of phthalyl chloride and substantially one molecular proportion of the mercaptobenzothiazole derivative of hexa-methylene-tetramine | 0.4 |

The rubber mix, after vulcanization, exhibited the modulus and tensile characteristics indicated in Table III.

Table III

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 45 | 20 | 198 | 480 | 2020 | 4050 | 830 |
| 60 | 20 | 237 | 616 | 2500 | 4565 | 820 |
| 90 | 20 | 259 | 691 | 2835 | 4400 | 790 |

The data set forth in Table III show that the accelerator employed is particularly valuable in effecting the cure of a rubber product, especially when employed in conjunction with a basic organic nitrogen-containing accelerator, for example, diphenylguanidine.

Another of the preferred class of accelerators, for example, the reaction product of substantially one molecular proportion of benzoyl chloride and substantially one molecular proportion of the mercaptobenzothiazole derivative of hexa-methylene-tetramine, was prepared in a manner analogous to that described above for the preparation of the reaction product of substantially one-half a molecular proportion of phthalyl chloride and substantially one molecular proportion of the mercaptobenzothiazole derivative of hexa-methylene-tetramine, except that during and after the addition of the benzoyl chloride, the reaction temperature was maintained at approximately 105 to 120° C.

A portion of the accelerator just described was compounded in the usual manner in a rubber stock comprising

|   | Parts |
|---|---|
| Pale crepe rubber | 100 |
| Zinc oxide | 5 |
| Sulfur | 3 |
| Stearic acid | 1 |
| The reaction product of benzoyl chloride and the mercaptobenzothiazole derivative of hexa-methylene-tetramine | 1 |

After vulcanizing the rubber stock thus compounded, the cured rubber product was found to possess the tensile and modulus characteristics set forth in Table IV.

Table IV

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 211 | 450 | 1910 | 3680 | 830 |
| 45 | 30 | 243 | 517 | 2245 | 4025 | 815 |
| 60 | 30 | 268 | 613 | 2570 | 4170 | 800 |

This accelerator was also compounded in a similar rubber stock in conjunction with diphenylguanidine. The composition of the said stock was as follows:

|   | Parts |
|---|---|
| Pale crepe rubber | 100 |
| Zinc oxide | 5 |
| Sulfur | 3 |
| Stearic acid | 1 |
| Diphenylguanidine | 0.2 |
| The reaction product of benzoyl chloride and the mercaptobenzothiazole derivative of hexa-methylene-tretramine | 0.8 |

The stock was cured, and on testing found to possess the following characteristics:

Table V

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 324 | 793 | 3260 | 4675 | 770 |
| 45 | 30 | 296 | 840 | 3750 | 4700 | 740 |
| 60 | 30 | 382 | 990 | 4125 | 4640 | 720 |

The results set forth in Tables IV and V show that the reaction product of benzoyl chloride and the mercaptobenzothiazole derivative of hexa-methylene-tetramine possesses very desirable accelerating properties, when employed in the vulcanization of rubber. These accelerating properties are markedly increased when employed in conjunction with a basic activator as for example diphenylguanidine.

Another of the preferred class of compounds, for example, the reaction product of substantially one molecular proportion of acetyl chloride and substantially one molecular proportion of the mercaptobenzothiazole derivative of hexa-methylene-tetramine, was prepared in a manner analogous to that described above for the preparation of the reaction product of substantially one-half a molecular proportion of phthalyl chloride and substantially one molecular proportion of the mercaptobenzothiazole derivative of hexa-methylene-tetramine, except that after the addition of the acetyl chloride, the reaction temperature was maintained at approximately 100 to 110° C., preferably for a period of approximately three to four hours. The product thus obtained was incorporated in a rubber stock comprising

| | Parts |
|---|---|
| Pale crepe rubber | 100 |
| Zinc oxide | 5 |
| Sulfur | 3 |
| Stearic acid | 1 |
| The reaction product of acetyl chloride and the mercaptobenzothiazole derivative of hexa-methylene-tetramine | 1 |

This rubber stock was cured in the usual manner and tested to determine its tensile and modulus properties. The results obtained are given in Table VI.

*Table VI*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 256 | 653 | 2910 | 4555 | 790 |
| 45 | 30 | 304 | 760 | 3240 | 4625 | 770 |
| 60 | 30 | 310 | 760 | 3480 | 4560 | 765 |

The reaction product of acetyl chloride and the mercaptobenzothiazole derivative of hexa-methylene-tetramine was also employed in conjunction with diphenylguanidine in the following rubber composition:

| | Parts |
|---|---|
| Pale crepe rubber | 100 |
| Zinc oxide | 5 |
| Sulfur | 3 |
| Stearic acid | 1 |
| Diphenylguanidine | 0.2 |
| The reaction product of acetyl chloride and the mercaptobenzothiazole derivative of hexa-methylene-tetramine | 0.8 |

The rubber stock thus prepared was cured and tested, and the vulcanized product was found to possess the following physical properties:

*Table VII*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 346 | 1010 | 4175 | 5140 | 745 |
| 45 | 30 | 262 | 1050 | 4530 | 4880 | 730 |
| 60 | 30 | 288 | 1015 | 4530 | 4800 | 715 |

Tables VI and VII show that the accelerator employed possesses the desirable accelerating properties of the preferred class of compounds, which accelerating properties are increased when employed in conjunction with a basic activator accelerator.

Another example of the preferred class of accelerators, comprising a reaction product of phthalyl chloride and the mercaptobenzothiazole derivative of acetaldehyde-ammonia, was prepared as follows: Substantially one molecular proportion of mercaptobenzothiazole and substantially one molecular proportion of acetaldehyde-ammonia were placed in a suitable vessel and heated slowly to approximately 130 to 145° C. Substantially one-half a molecular proportion of phthalyl chloride was then added and the temperature maintained at approximately 115 to 130° C. for a suitable period of time necessary to complete the reaction, preferably for a period of approximately one hour. A portion of the product thus formed was compounded in a rubber stock comprising

| | Parts |
|---|---|
| Pale crepe rubber | 100 |
| Zinc oxide | 5 |
| Sulfur | 3 |
| Stearic acid | 1 |
| The reaction product of phthalyl chloride and the mercaptobenzothiazole derivative of acetaldehyde-ammonia | 1 |

The stock was cured in the usual manner and found upon testing to possess the characteristics set forth in Table VIII.

*Table VIII*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 111 | 203 | 463 | 1755 | 920 |
| 45 | 30 | 140 | 272 | 775 | 2440 | 900 |
| 60 | 30 | 175 | 344 | 988 | 2440 | 860 |

This accelerator was also employed in conjunction with diphenylguanidine in the following rubber mix:

| | Parts |
|---|---|
| Pale crepe rubber | 100 |
| Zinc oxide | 5 |
| Sulfur | 3 |
| Stearic acid | 1 |
| Diphenylguanidine | 0.2 |
| The reaction product of phthalyl chloride and the mercaptobenzothiazole derivative of acetaldehyde-ammonia | 0.8 |

The rubber stock thus formed was cured and the vulcanized product submitted to physical tests. The results follow in Table IX.

*Table IX*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 309 | 668 | 2660 | 4290 | 800 |
| 45 | 30 | 353 | 840 | 3105 | 4595 | 785 |
| 60 | 30 | 362 | 847 | 3285 | 4725 | 780 |

The data set forth in Tables VIII and IX show that the reaction product of phthalyl chloride and the mercaptobenzothiazole derivative of acetaldehyde-ammonia possesses valuable accelerating properties when employed in the rubber vulcanization process. These accelerating properties are greatly increased in the presence of a basic organic nitrogen-containing activator accelerator.

Another example of the preferred new class of materials, comprising a reaction product of benzoyl chloride and a mercaptobenzothiazole derivative of a reaction product of butyraldehyde and ammonia, was prepared as follows: Substantially three molecular proportions of butyraldehyde were treated with gaseous ammonia until no more was absorbed. The oily product was separated from the water formed by the reaction, and the former was further treated with substantially one molecular proportion of mercaptobenzothiazole by heating the reactants together at approximately 55 to 65° C. for a short period of time, for example, approximately ten minutes. Substantially one molecular proportion of benzoyl chloride was slowly added while agitating and maintaining the temperature of the mixture at approximately 80 to 90° C. This temperature was maintained, after the addition of benzoyl chloride had been completed, for a suitable period of time necessary to complete the reaction, for example, for a period of approximately one hour.

A portion of the product thus formed was incorporated in a rubber stock of the following composition:

| | Parts |
|---|---|
| Pale crepe rubber | 100 |
| Zinc oxide | 5 |
| Sulfur | 3 |
| Stearic acid | 1 |
| The benzoyl chloride reaction product of the mercaptobenzothiazole derivative of the reaction product of butyraldehyde and ammonia, prepared as described above | 1 |

The compounded rubber stock was cured in the usual manner, and the resulting product tested to determine its physical characteristics. The results are set forth in Table X.

*Table X*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 338 | 845 | 3420 | 4950 | 790 |
| 45 | 30 | 384 | 983 | 3655 | 4960 | 780 |
| 60 | 30 | 318 | 935 | 3635 | 4900 | 770 |

The above results show that the accelerator employed possesses the valuable properties of the preferred class of compounds.

The accelerator described above was also employed in conjunction with diphenylguanidine in a similar stock, and the mixed accelerator thus formed was also found to possess desirable accelerating properties when employed in the rubber vulcanization process.

Another example of the new class of accelerators, comprising a reaction product of phthalyl chloride and a mercaptobenzothiazole derivative of triheptylidene-diamine, was prepared as follows: Substantially one molecular proportion of triheptylidene-diamine, $(C_7H_{14})_3N_2$, prepared from substantially three molecular proportions of heptaldehyde and substantially two molecular proportions of ammonia, was treated in a suitable vessel with substantially one molecular proportion of mercaptobenzothiazole while maintaining the reaction temperature at approximately 70 to 80° C. until reaction was complete. Substantially one-half a molecular proportion of phthalyl chloride was added slowly while maintaining the temperature at approximately 80 to 90° C. This temperature was maintained for a suitable period necessary to complete the reaction, after all the phthalyl chloride had been added, preferably for a period of approximately one hour. A portion of the product thus formed was incorporated in the usual manner in a rubber mix comprising

| | Parts |
|---|---|
| Pale crepe rubber | 100 |
| Zinc oxide | 5 |
| Sulfur | 3 |
| Stearic acid | 1 |
| The reaction product of phthalyl chloride and the mercaptobenzothiazole derivative of triheptylidene-diamine | 1 |

The stock thus formed was cured and the vulcanized rubber products submitted to physical tests. The results are set forth in Table XI.

*Table XI*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 381 | 974 | 3865 | 5225 | 780 |
| 45 | 30 | 408 | 1108 | 4075 | 5100 | 760 |
| 60 | 30 | 413 | 1108 | 4105 | 4605 | 740 |

The results given in Table XI show that the accelerator employed possesses very desirable properties when used in a rubber mix of vulcanization characteristics.

Another example of the preferred class of compounds, comprising a reaction product of phthalyl chloride and the piperidine salt of mercaptobenzothiazole, was prepared as follows: Substantially one molecular proportion of phthalyl chloride was added to substantially two molecular proportions of the piperidine salt of mercaptobenzothiazole in a suitable vessel. After all the phthalyl chloride had been added, the temperature of the mixture was maintained at approximately 90 to 100° C. for a period of time sufficient to complete the reaction, preferably for approximately one hour. A portion of the product thus formed was compounded in a rubber stock comprising

| | Parts |
|---|---|
| Pale crepe rubber | 100 |
| Zinc oxide | 5 |
| Sulfur | 3 |
| Stearic acid | 1 |
| The reaction product of phthalyl chloride and the piperidine salt of mercaptobenzothiazole | 0.75 |

After vulcanization, the rubber stock thus formed was tested and found to possess the following modulus and tensile characteristics:

*Table XII*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 255 | 578 | 2640 | 4095 | 790 |
| 45 | 30 | 248 | 697 | 3125 | 4300 | 755 |
| 60 | 30 | 300 | 731 | 3220 | 4525 | 760 |

These data show that the accelerator employed possesses the valuable properties of the preferred class of compounds.

Another of the preferred class of accelerators, for example, a reaction product of benzoyl chloride and the piperidine salt of mercaptobenzothiazole, was prepared as follows: Substantially one molecular proportion of benzoyl chloride was added slowly to substantially one molecular proportion of the piperidine salt of mercaptobenzothiazole, preferably in the presence of a liquid medium, for example, benzol. The mixture was preferably maintained at a refluxing temperature for a short period after all the benzoyl chloride had been added. The liquid medium employed was then removed by any convenient means, as for example by distillation under subatmospheric pressure. A portion of the material thus prepared was incorporated in a rubber stock comprising

| | Parts |
|---|---|
| Pale crepe rubber | 100 |
| Zinc oxide | 5 |
| Sulfur | 3 |
| Stearic acid | 1 |
| The reaction product of benzoyl chloride and the piperidine salt of mercaptobenzothiazole | 0.75 |

The stock thus formed was cured and the vulcanized rubber product tested for physical characteristics. The results are as follows:

*Table XIII*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 182 | 461 | 2175 | 3880 | 820 |
| 45 | 30 | 214 | 552 | 2645 | 4180 | 800 |
| 60 | 30 | 275 | 668 | 2900 | 4435 | 790 |

The results set forth in Table XIII show that the benzoyl chloride reaction product of the piperidine salt of mercaptobenzothiazole possesses the desirable accelerating properties of the preferred class of compounds.

Another of the preferred class of accelerators, for example, a reaction product of phthalyl chloride and a mercaptobenzothiazole salt of para-para-diamino-diphenylmethane, was prepared as follows: Substantially one molecular proportion of phthalyl chloride was added slowly to substantially two molecular proportions of the salt formed by reacting substantially equal molecular proportions of mercaptobenzothiazole and para-para-diaminodiphenylmethane, while agitating. Any liquid vaporizing in the process was retained by means of a reflux condenser. After the phthalyl chloride had been added, the mixture was preferably heated at approximately 150 to 160° C. for a period sufficient to complete the reaction, preferably for approximately two hours. A portion of the product thus prepared was compounded in a rubber stock of the following composition:

| | Parts |
|---|---|
| Pale crepe rubber | 100 |
| Zinc oxide | 5 |
| Sulfur | 3 |
| Stearic acid | 1 |
| The reaction product of phthalyl chloride and the mercaptobenzothiazole salt of para-para-diamino-diphenylmethane | 1 |

The stock thus formed was cured in the usual manner and the vulcanized product tested to determine its modulus and tensile properties. The results are as follows:

*Table XIV*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 30 | 30 | 154 | 373 | 1340 | 3510 | 875 |
| 45 | 30 | 221 | 486 | 1900 | 3640 | 810 |
| 60 | 30 | 229 | 543 | 2125 | 3825 | 805 |

This accelerator was also employed in conjunction with diphenylguanidine in the following rubber mix:

| | Parts |
|---|---|
| Pale crepe rubber | 100 |
| Zinc oxide | 5 |
| Sulfur | 3 |
| Diphenylguanidine | 0.6 |
| The reaction product of phthalyl chloride and the mercaptobenzothiazole salt of para-para-diamino-diphenylmethane | 0.4 |

The rubber stock thus prepared was cured and the vulcanized product tested in the usual manner. The results follow in Table XV.

*Table XV*

| Cure | | Modulus of elasticity in lbs/in² at elongations of | | | Tensile at break in lbs/in² | Ultimate elongation percent |
|---|---|---|---|---|---|---|
| Time minutes | Steam pressure lbs. | 300% | 500% | 700% | | |
| 45 | 20 | 304 | 822 | 3450 | 4700 | 760 |
| 60 | 20 | 338 | 913 | 3650 | 4465 | 740 |
| 90 | 20 | 365 | 1050 | 4010 | 4775 | 740 |

The results of the various tests described above show conclusively that the preferred class of materials constitutes an important new class of accelerators for the rubber vulcanization process.

In like manner, other organic bases may be reacted with a mercaptoarylthiazole, and the resulting products may be further reacted with organic acid halides to form further examples of the preferred new class of accelerators. Thus, diphenylguanidine, ethylidene aniline, diethylamine, dibenzylamine, triethanolamine, 2, 4-diaminodiphenylamine, para - phenylenediamine, aniline, beta-naphthylamine, morpholine, anhydro-formaldehyde-aniline, the reaction product of crotonaldehyde and the mercaptobenzothiazole derivative of hexa-methylene-tetramine, and the like, form double salt-like compounds when reacted with mercaptobenzothiazole, mercaptotolylthiazole, mercaptonaphthothiazoles, and the like, and the products thus formed may be further reacted with acetyl chloride, acetyl bromide, succinyl chloride, benzoyl chloride, phthayl chloride, heptoyl chloride, benzoyl iodide, and the like, and the final products formed employed as accelerators in the rubber vulcanization process.

In the above described examples of the use of the preferred class of accelerators, diphenylguanidine was employed as the preferred activator in those cases where a mixed accelerator was employed. Other accelerators comprising a basic organic nitrogen-containing compound could have been used in its stead. Thus, di-ortho-tolylguanidine, phenylhydrazine, piperazine, anhydro-formaldehydeaniline, and the like, are adaptable for use as an activator, with resulting improvement in the vulcanization of the rubber stocks, as in the case of diphenylguanidine.

The present invention is limited only as defined in the following claims, in which it is intended to claim all novelty inherent in the invention as broadly as is permissible in view of the prior art.

What is claimed is:

1. The process of vulcanizing rubber which comprises heating rubber and sulfur in the presence of an accelerator comprising a reaction product of an organic acid halide and a mercaptoarylthiazole derivative of an organic base.

2. The process of vulcanizing rubber which comprises heating rubber and sulfur in the presence of an accelerator comprising a reaction product of an organic acid halide and a mercaptobenzothiazole derivative of an organic base.

3. The process of vulcanizing rubber which comprises heating rubber and sulfur in the presence of an accelerator comprising a reaction product of an organic acid chloride and a mercaptobenzothiazole derivative of an organic base.

4. The process of vulcanizing rubber which comprises heating rubber and sulfur in the presence of an accelerator comprising a reaction product of an organic acid chloride and a mercaptobenzothiazole derivative of a reaction product of an aldehyde and ammonia.

5. The process of vulcanizing rubber which comprises heating rubber and sulfur in the presence of an accelerator comprising a reaction product of an organic acid chloride and a mercaptobenzothiazole derivative of a reaction product of an aliphatic aldehyde and ammonia.

6. The process of vulcanizing rubber which comprises heating rubber and sulfur in the presence of an accelerator comprising a reaction product of an organic acid chloride and a mercaptobenzothiazole derivative of an organic amine.

7. The process of vulcanizing rubber which comprises heating rubber and sulfur in the presence of an accelerator comprising a reaction product of an organic acid chloride and a mercaptobenzothiazole derivative of an organic tertiary amine.

8. The process of vulcanizing rubber which comprises heating rubber and sulfur in the presence of an accelerator comprising a reaction product of an organic acid chloride and a mercaptobenzothiazole derivative of hexa-methylene-tetramine.

9. The process of vulcanizing rubber which comprises heating rubber and sulfur in the presence of an accelerator comprising a reaction product of an aromatic acid chloride and a mercaptobenzothiazole derivative of hexa-methylene-tetramine.

10. The process of vulcanizing rubber which comprises heating rubber and sulfur in the presence of an accelerator comprising a reaction product of an aromatic acid chloride containing a single benzene nucleus and a mercaptobenzothiazole derivative of hexa-methylene-tetramine.

11. The process of vulcanizing rubber which comprises heating rubber and sulfur in the presence of an accelerator comprising a reaction product of phthalyl chloride and a mercaptobenzothiazole derivative of hexa-methylene-tetramine.

12. The process of vulcanizing rubber which comprises heating rubber and sulfur in the presence of an accelerator comprising a material formed by reacting substantially one molecular proportion of hexa-methylene-tetramine with substantially one and one-half molecular proportions of mercaptobenzothiazole and further reacting the product thus formed with substantially one-half a molecular proportion of phthalyl chloride.

13. The process of vulcanizing rubber which comprises heating rubber and sulfur in the presence of a mixed accelerator comprising a basic organic nitrogen-containing accelerator and a reaction product of an organic acid chloride and a mercaptobenzothiazole derivative of an organic base.

14. The process of vulcanizing rubber which comprises heating rubber and sulfur in the presence of a mixed accelerator comprising a basic organic nitrogen-containing accelerator and a reaction product of an organic acid chloride and a mercaptobenzothiazole derivative of a reaction product of an aliphatic aldehyde and ammonia.

15. The process of vulcanizing rubber which comprises heating rubber and sulfur in the presence of a mixed accelerator comprising a basic organic nitrogen-containing accelerator and a reaction product of an organic acid chloride and a mercaptobenzothiazole derivative of hexa-methylene-tetramine.

16. The process of vulcanizing rubber which comprises heating rubber and sulfur in the presence of a mixed accelerator comprising diphenylguanidine and a reaction product of phthalyl chloride and a mercaptobenzothiazole derivative of hexa-methylene-tetramine.

17. The vulcanized rubber produced by heating rubber and sulfur in the presence of an accelerator comprising a reaction product of an organic acid halide and a mercaptoarylthiazole derivative of an organic base.

18. The vulcanized rubber produced by heating rubber and sulfur in the presence of an accelerator comprising a reaction product of an organic acid halide and a mercaptobenzothiazole derivative of an organic base.

19. The vulcanized rubber produced by heating rubber and sulfur in the presence of an accelerator comprising a reaction product of an organic acid chloride and a mercaptobenzothiazole derivative of an organic base.

20. The vulcanized rubber produced by heating rubber and sulfur in the presence of an accelerator comprising a reaction product of an organic acid chloride and a mercaptobenzothiazole derivative of a reaction product of an aldehyde and ammonia.

21. The vulcanized rubber produced by heating rubber and sulfur in the presence of an accelerator comprising a reaction product of an organic acid chloride and a mercaptobenzothiazole derivative of a reaction product of an aliphatic aldehyde and ammonia.

22. The vulcanized rubber produced by heating rubber and sulfur in the presence of an accelerator comprising a reaction product of an organic acid chloride and a mercaptobenzothiazole derivative of an organic amine.

23. The vulcanized rubber produced by heating rubber and sulfur in the presence of an accelerator comprising a reaction product of an organic acid chloride and a mercaptobenzothiazole derivative of an organic tertiary amine.

24. The vulcanized rubber produced by heating rubber and sulfur in the presence of an accelerator comprising a reaction product of an organic acid chloride and a mercaptobenzothiazole derivative of hexa-methylene-tetramine.

25. The vulcanized rubber produced by heating rubber and sulfur in the presence of an accelerator comprising a reaction product of an aromatic acid chloride and a mercaptobenzothiazole derivative of hexa-methylene-tetramine.

26. The vulcanized rubber produced by heating rubber and sulfur in the presence of an accelerator comprising a reaction product of an aromatic acid chloride containing a single benzene nucleus and a mercaptobenzothiazole derivative of hexa-methylene-tetramine.

27. The vulcanized rubber produced by heating rubber and sulfur in the presence of an accelerator comprising a reaction product of phthalyl chloride and a mercaptobenzothiazole derivative of hexa-methylene-tetramine.

28. The vulcanized rubber produced by heating rubber and sulfur in the presence of an accelerator comprising a material formed by reacting substantially one molecular proportion of hexa-methylene-tetramine with substantially one and one-half molecular proportions of mercaptobenzothiazole and further reacting the product thus formed with substantially one-half a molecular proportion of phthalyl chloride.

29. The vulcanized rubber produced by heating rubber and sulfur in the presence of a mixed accelerator comprising a basic organic nitrogen-containing accelerator and a reaction product of an organic acid chloride and a mercaptobenzothiazole derivative of an organic base.

30. The vulcanized rubber produced by heating rubber and sulfur in the presence of a mixed accelerator comprising a basic organic nitrogen-containing accelerator and a reaction product of an organic acid chloride and a mercaptobenzothiazole derivative of a reaction product of an aliphatic aldehyde and ammonia.

31. The vulcanized rubber produced by heating rubber and sulfur in the presence of a mixed accelerator comprising a basic organic nitrogen-containing accelerator and a reaction product of an organic acid chloride and a mercaptobenzothiazole derivative of hexa-methylene-tetramine.

32. The vulcanized rubber produced by heating rubber and sulfur in the presence of a mixed accelerator comprising diphenyl-guanidine and a reaction product of phthalyl chloride and a mercaptobenzothiazole derivative of hexa-methylene-tetramine.

ROBERT L. SIBLEY.